Dec. 24, 1963
E. C. EVANS
3,115,613
LIQUID RHEOSTATS
Filed Dec. 15, 1961
2 Sheets-Sheet 1
FIG. 1
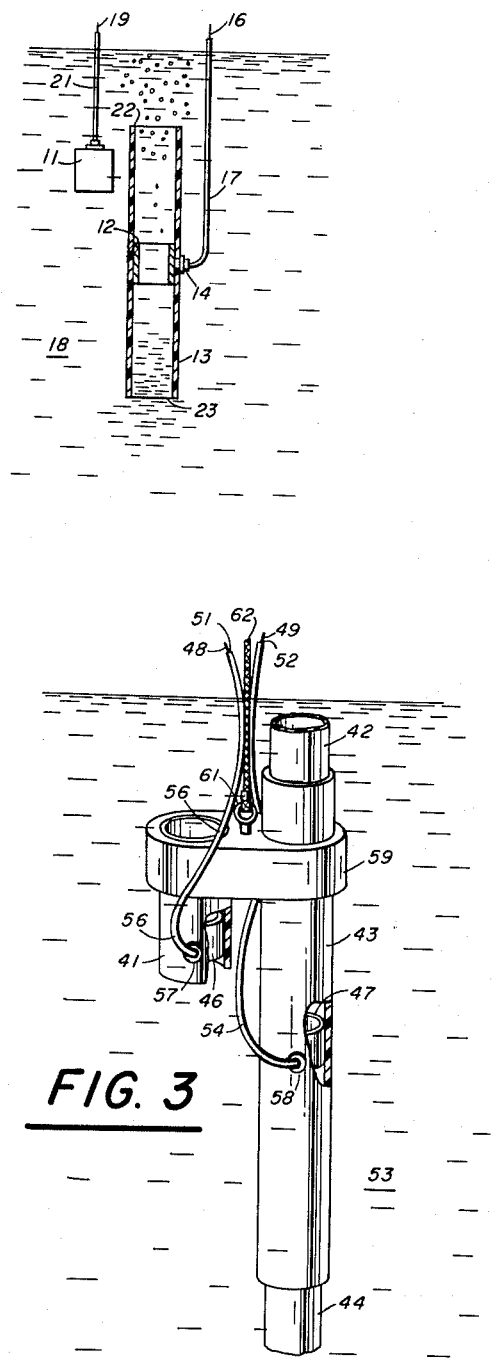
FIG. 2
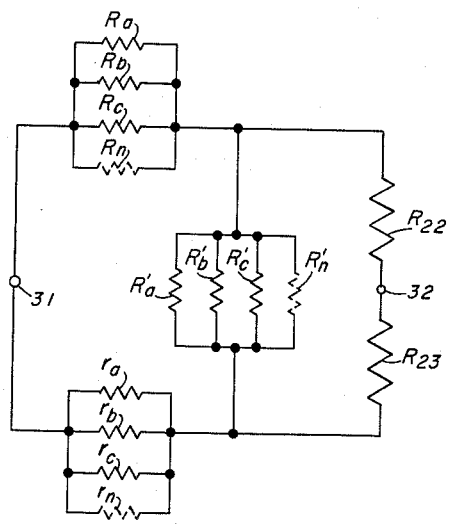
FIG. 3
FIG. 4
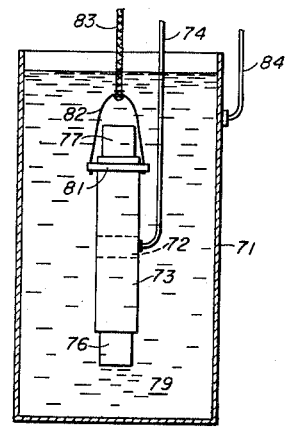
INVENTOR.
ELMER C. EVANS
BY
*ATTORNEYS*

Dec. 24, 1963  E. C. EVANS  3,115,613
LIQUID RHEOSTATS
Filed Dec. 15, 1961  2 Sheets-Sheet 2

INVENTOR.
ELMER C. EVANS
BY
ATTORNEYS

United States Patent Office 3,115,613
Patented Dec. 24, 1963

3,115,613
LIQUID RHEOSTATS
Elmer C. Evans, 7976 Lemon Circle, La Mesa, Calif.
Filed Dec. 15, 1961, Ser. No. 159,806
10 Claims. (Cl. 338—80)
(Granted under Title 35, U.S. Code (1952), sec. 266)

The invention described herein may be manufactured and used by or for the Government of the United States of America for governmental purposes without the payment of any royalties thereon or therefor.

The invention pertains to new and useful improvements in rheostats and more particularly to that type in which liquid is used as the resistive medium.

Many attempts have been made to use liquid resistive material in rheostat apparatus. One such apparatus employs a large open-top container of brine. An intricate, adjustable, suspension mechanism supports two pointed electrodes above the brine so that the tips of the electrodes are just immersed in the brine. When a voltage is applied to the electrodes the brine offers a multitude of electric paths to current flow and the resulting resistance between the electrodes is very small. As the tips of the electrodes are made small (to increase the resistance) they readily burn away and cause the electrical conduction in the brine to become sporadic and/or terminate. The apparatus, in addition to having low resistance and low power capacity, is bulky and expensive. The number of electrical and electronic equipments that can be tested on a low-resistance, low-power-capacity, load is of course limited.

Attempts have been made to provide liquid resistors with restricted current paths. One such apparatus employs two elecarodes and two insulative cups. The electrodes are respectively situated inside the cups near the cup bases, and the cups and the electrodes are both completely submerged in a tank of brine. The apparatus has slightly more resistance than the above-mentioned apparatus, however, it will only handle a small amount of current and the electrodes as well as the cups will disintegrate if much current is drawn.

It is an object of this invention to provide an improved liquid rheostat that is capable of producing a high resistance as well as a large power capacity.

Advantages of the invention are simplicity and economy of construction.

It is another advantage of the invention that the electrode support structure is very light weight.

Other objects and advantages of the invention will be apparent from a study of the following specifications, read in connection with the accompanying drawings, wherein:

FIG. 1 illustrates the general principles on which the invention is predicated;

FIG. 2 is a circuit schematic of the apparatus of FIG. 1;

Figure 6:
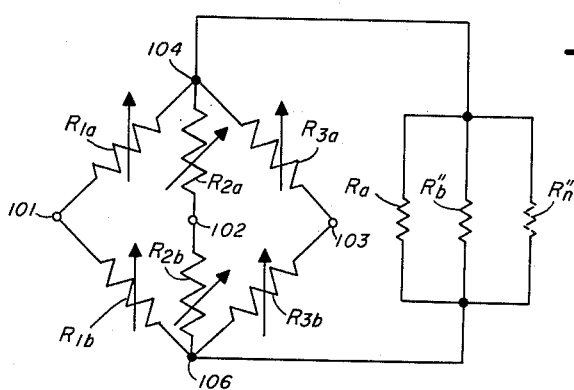
Figure 5:
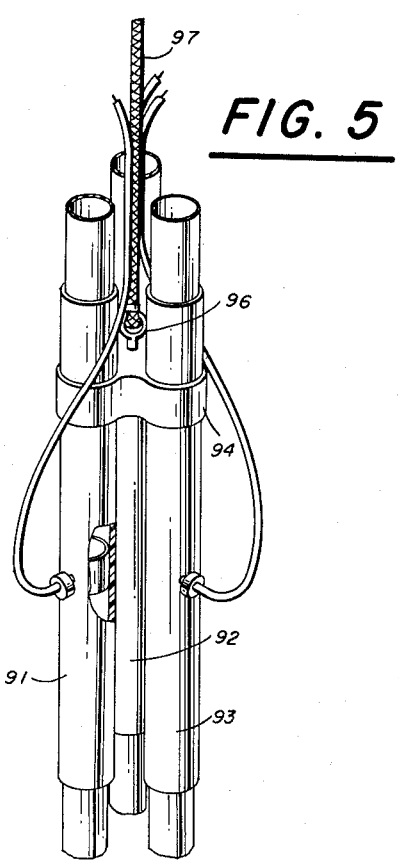
Figure 7:
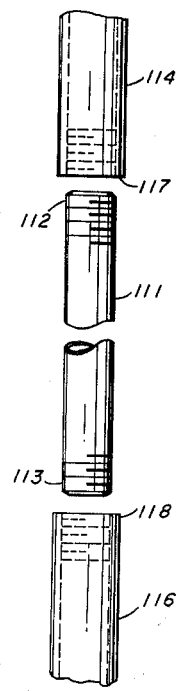

FIG. 3 pictorially discloses a liquid rheostat in accordance with the invention;

FIG. 4 shows schematically rheostat apparatus in accordance with the invention operating with an electrode different from that shown in FIG. 3;

FIG. 5 pictorially discloses, in accordance with the invention, rheostat apparatus suited for three-phase networks;

FIG. 6 schematically illustrates the circuit configuration of the apparatus of FIG. 5; and FIG. 7 is modified apparatus for adjusting the resistance of the rheostat apparatus.

The principles on which the invention is based will be best understood by referring to FIG. 1. A hollow electrode 12 is disposed within conduit 13 which is an electrical insulator. Electric wire 16 is covered with electric insulation 17 which is impervious to liquid 18. The cable penetrates plug 14 and conduit 13 and is electrically connected to electrode 12. Plug 14 prevents liquid 18 from entering the cable passage in the side of conduit 13. Wire 19 is connected to electrode 11 and covered with electric insulation 21 which is impervious to liquid 18. Liquid 18 is an electrolyte and may be, for example, water containing: an acid such as sulfuric acid ($H_2SO_4$) or a base such as sodium hydroxide (NaOH), or a salt such as sodium chloride (NaCl). Electrodes 11 and 12 are preferably made of a material that is substantially chemically inactive to the electrolyte. As platinum is a good conductor of electricity and is resistant to attack by air, water, hydrofluoric acid, hydrochloric acid, nitric acid and dilute sulfuric acid, it may, for example, be employed for the electrodes. The resistance between electrodes 11 and 12 is dependent on the quantity and quality of electric conduction paths between the electrodes. There are a multitude of paths through the electrolyte from electrode 11 to ends 22 and 23 of conduit 13, but since conduit 13 is an electrical insulator the number of direct paths from end 22 to end 23 are limited by the interior dimensions of tube 13. The conduction paths from end 22 to electrode 12 or the paths from end 23 to electrode 12 are thus in series with any conduction path from electrode 11 to ends 22 or 23. The resistance from end 22 to electrode 12 is fixed and so is the resistance from end 23 to electrode 12. Each resistance depends directly on the resistivity of the electrolyte and the length of the electrolyte column from the end of the conduit to the electrode and depends inversely on the cross-sectional interior area of the conduit. If the electrolyte is a solution as mentioned above, its resistivity varies with the concentration and temperature of the solution. By varying these parameters, the resistances of the electrolyte columns may be made large or small as desired.

FIG. 2 schematically illustrates an approximate electric circuit configuration of the apparatus of FIG. 1. Terminals 31 and 32 represent electrodes 11 and 12, respectively. Resistors $R_a$ to $R_n$ represent the multitude of parallel resistance paths between electrode 11 and the end of conduit 13. Resistances $r_a$ to $r_n$ represent the parallel resistance paths between electrode 31 and end 23 of conduit 23. Resistances $R'_a$ to $R'_n$ represent the parallel resistances between the ends of the conduit. Resistance $R_{22}$ represents the resistance of the column of liquid in the conduit between end 22 and electrode 12, and resistance $R_{23}$ represents the resistance of the column of liquid between end 23 and electrode 12. The total resistance across resistances $R_a$ to $R_n$ is very small and approaches zero. The total resistances of the $R'_a$ to $R'_n$ and $r_a$ to $r_n$ parallel combinations are similarly small.

Ignoring the parallel combinations $R_a$–$R_n$, $r_a$–$r_n$ and $R'_a$–$R'_n$, the resistance between terminals 31 and 32 is equal to $$\frac{R_{22} \times R_{23}}{R_{22} + R_{23}}$$

Referring again to FIG. 1, when a voltage is applied across cables 16 and 19, heat is dissipated in the electrolyte between electrode 11 and 12.

The maximum safe current that a rheostat can carry is usually limited by the rise in temperature caused by the heat liberated. Referring to FIG. 1 again, when a voltage is applied across cables 16 and 19 and a current flows between electrodes 11 and 12, the heat liberated is readily dissipated in the electrolyte. As electrode 12 is hollow, electrolyte may pass readily through the interior of conduit 13. When the electrolyte within conduit heats, it rises and draws cooler electrolyte up to 12. The apparatus performs like a pump, taking in liquid at the lower end of the conduit and expelling it at the high end. No structure impedes the flow of liquid about electrode 11 and it is also cooled by convection. The net result is that the apparatus is capable of safely handling large electric current flow. The amount of current carried by the apparatus may be further increased by increasing the size of the electrolyte reservoir and/or forcing electrolyte past the electrodes by external circulating means (not shown).

The rheostat apparatus of FIG. 3 is equipped with tubular conduits 41 to 44. Conduits 42 and 44 telescope within conduit 43. A liquid-tight telescopic sliding joint is provided at each end of conduit 43 so as to enable conduits 42 and 44 to be moved with respect to conduit 43 without admitting liquid into the joints. Conduits 41 to 44 are made of a material that is a good electrical insulator. The conduits or tubes may be made, for example, from rubber or plastics. Suitable plastics include, for example, Teflon, Bakelite and polystyrene. Cylindrical electrodes 46 and 47 are fixed within conduits 41 and 43, respectively. Cables 54 and 56 consisting of wires 48 and 49, respectively, and insulators 51 and 52, respectively, feed through sealing plugs 57 and 58 which are fixed in apertures in conduits 41 and 43. Plugs 57 and 58 seal the apertures so that no electrolyte is permitted to enter. The ends of wires 48 and 49, in conduits 41 and 43, respectively, are electrically connected to electrodes 46 and 47. An eye 61 is fastened to the top of collar 59 which is, in turn, rigidly fastened to conduits 41 and 43. A cable 62 is fastened to eye 61 and is used to suspend the rheostat in electrolyte 53.

In operation, cables 54 and 56 are connected to an electrical circuit which may be, for example, the output of a D.-C. generator, the output of an alternator or the output of an amplifier. Adjustable conduits 42 and 44 are positioned to give the desired resistance between electrodes 46 and 47. Of course, as conduits 42 and 44 are extended from conduit or tube 43, the rheostat resistance is increased, and conversely, as the tubes 42 and 44 are moved within tube 43, the rheostat resistance is decreased.

The apparatus of FIG. 4 differ from that of FIG. 3 in that it employs electrolyte container 71 as one of the electrodes. Hollow electrode 72 is fixed within insulative conduit 73 and electrically connected to electric cable 74. Plug 78 prevents electrolyte 79 from entering the aperture in the side of conduit where cable connects to electrode 72. Insulative conduits 76 and 77 telescope into conduit 73 by means of liquid-tight telescopic sliding joints. Collar 81 is fastened to the top of conduit 73. A yoke 77 is pivotably attached to collar 81. The yoke is fastened to and suspended from cable 83. An electric lead 84 is fastened to container 71 which is made of a material which is a good conductor of electricity. In operation the rheostat is connected to an electric circuit by means of cable 74 and wire 84. The resistance of the rheostat is adjusted by positioning telescoping conduits 76 and 77 with respect to conduit 73. The rheostat apparatus in FIG. 5 is provided with adjustable conduit structure identical to that disclosed in FIG. 3, however, three adjustable conduits are employed in the apparatus of FIG. 5 instead of one. Tubes or conduits 91 to 93 (FIG. 5) are identical to conduit 43 of FIG. 1 and they are each provided with hollow electrode apparatus, telescoping tube apparatus and electric cable apparatus identical to that employed with tube 43. Tubes 91 to 93 are rigidly fastened together by means of collar 94. An eye 96 is fixedly imbedded in collar 94 and a cable 97 is attached to the eye. In operation the apparatus is immersed and held suspended in an electrolyte by means of suspending cable 97.

An approximate schematic circuit of the rheostat apparatus of FIG. 5 is shown in FIG. 6. Resistances $R_{1a}$, $R_{2a}$ and $R_{3a}$ respectively represent the resistances of the columns of electrolyte in conduits 91 to 93 above the hollow electrodes. Resistances $R_{1b}$, $R_{2b}$ and $R_{3b}$ respectively represent the resistances of the columns of electrolyte in conduits 91 to 93 below the hollow electrodes. Terminals 101 to 103 represent the hollow electrodes in tubes 91 to 93, respectively. Resistances $R''_a$ to $R''_n$ represent the multitude of shunt paths between the opposite ends of the conduits. The sum of these resistances is very small and approaches zero. If the total resistance is zero then junctions 104 and 106 are shorted together and a Y or star resistive network is formed.

An advantage of the embodiment in FIG. 5 is that it may be employed in a three-phase network and used, for example, to load the output of a three-phase attenuator. Of course, the rheostat may still be employed in a single-phase circuit. A single-phase circuit may be connected between two of the electrodes with either the third electrode left disconnected or shorted to one of the other electrodes. The resistance of the rheostat under these conditions will be apparent from an inspection of FIG. 6.

It should be understood that the use of telescoping members is not the only means of adjusting the length and thus, the resistance of the rheostat. FIG. 7 illustrates a tubular conduit employed to house a hollow electrode in accordance with the invention. Ends 112 and 113 of the tube are threaded. Matching threads are cut inside tubes 114 and 116 at ends 117 and 118. A number of end or stub tubes 114 and 116 may be made in a variety of lengths so that a variety of resistances may be achieved by threading different end tubes onto principal tube 111.

It should be appreciated that the apparatus disclosed in FIGS. 3 and 5 need not be immersed in a confined tank of electrolyte. As brine is an electrolyte, the apparatus may be immersed directly in salt water such as the ocean. The apparatus may be suspended from a vessel such as a submarine and employed as a load for electrical equipment aboard such as sonar amplifiers, generators, alternators and so forth. It will readily handle kilowatts of energy. Unlike some liquid rheostats the present invention has no critical immersion depth and requires no complicated depth-regulated suspension means. The apparatus need only be totally immersed to operate. It may be lowered by a cable to any desired depth and left there.

The conduits illustrated are linear and have uniform cross-sections. It should be understood that the conduits may be non-linear or curved and that they may have cross-sections that vary as the length of the conduits is traversed. Although electric cables have been illustrated it should be appreciated that other types of insulated electric conductors may be employed to carry current to the rheostat electrodes. For example, rigid electrical conducting rods or bars covered with electric insulation may be employed. Such conductors may also suspend or support the rheostats and obviate the need of separate suspension apparatus. The ease with which the rheostats may be multiplied and connected in series, parallel or series-parallel to vary power capacity and/or ohmic resistance should be readily apparent.

Obviously many modifications and variations of the present invention are possible in the light of the above teachings. It is therefore to be understood that within the scope of the appended claims the invention may be practiced otherwise than as specifically described.

What is claimed is:

1. A liquid resistor having large power capacity comprising an insulative conduit, said conduit being substantially symmetrical to a line extending through its interior, a hollow electrode being substantially symmetrical to a line extending through its interior, said electrode being disposed within said conduit, said lines of said hollow electrode and said conduit being substantially parallel, said conduit having an aperture in proximity to said hollow electrode, said conductor being covered with electric insulation, a first electric conductor, said conductor being electrically connected to said hollow electrode and passing through said aperture, means for sealing said aperture, an electrode extrinsic to said conduit, an electric conductor connected to said extrinsic electrode, an electrolyte, said electrolyte wetting said electrodes and said conduit so to provide a plurality of electric conduction paths between said electrodes.

2. A resistor in accordance with claim 1 wherein the ends of said conduit are adjustable in length.

3. A liquid rheostat having a high power capacity comprising, a first conduit, a first hollow electrode disposed within said first conduit, second and third conduits telescoping, respectively, with the ends of said first conduit, said first conduit having an aperture in proximity to said first hollow electrode, a first electric cable, said first cable being connected to said hollow electrode and passing through said aperture, means for sealing said aperture, a fourth conduit extrinsic to said first conduit, a second hollow electrode disposed within said fourth conduit, a second electric cable, said cable being connected to said second electrode, a collar, said collar being attached to the peripheries of said first and said fourth conduits, an electrolyte, said conduits and said electrodes being immersed in said electrolyte providing electric conduction paths between said electrodes.

4. Electrode apparatus for a high power capacity liquid rheostat comprising an insulative conduit, said conduit being substantially symmetrical to a line extending through the interior of said conduit, a hollow electrode, said electrode being substantially symmetrical to a line extending through the interior of said electrode, said electrode disposed within said conduit so that said line of said electrode and said line of said conduit are substantially parallel, said conduit having an aperture in proximity to said electrode, an electric cable, said cable being connected to said electrode and passing through said aperture, and means for sealing said aperture.

5. Apparatus in accordance with claim 4 wherein said ends of said conduit are adjustable in length.

6. A liquid rheostat having a large power capacity comprising a first conduit with ends which are adjustable in length, a first hollow electrode, said first hollow electrode being disposed within said conduit, said first conduit having an aperture near said first hollow electrode, an electric cable, said cable being connected to said first hollow electrode and passing through said aperture, means for sealing said aperture so as to make it liquid tight, a second conduit extrinsic to said first conduit, a second hollow electrode disposed within said second conduit, said second conduit having an aperture in proximity to said second hollow electrode, said second cable being connected to said second electrode and passing through said second conduit aperture, said first and said second conduits being joined by a collar, an electrolyte, said conduits, said electrodes and at least portions of said cables being immersed in said electrolyte, said electrolyte providing electric conduction paths between said electrodes.

7. A liquid rheostat having a large power capacity comprising an insulative conduit, said ends of said conduit being adjustable in length, a hollow electrode, said electrode being disposed within said conduit, said conduit having an aperture in proximity to said hollow electrode, an electric cable, said cable being connected to said electrode and passing through said conduit aperture, means for sealing said aperture, a tank made of material which is an electrical conductor, said tank containing an electrolyte, said conduit being submerged in said electrolyte, said electrolyte providing electric conduction paths between said electrode and said tank.

8. Resistive apparatus adapted to carry a large electrical current comprising an insulating conduit, said conduit being substantially symmetrical to a first longitudinal axis, a hollow electrode being substantially symmetrical to a second longitudinal axis, said electrode being shorter than said conduit, said electrode being fixed within said conduit, said axes of said conduit and said electrode being substantially parallel, a first electric cable, said conduit having an aperture near said electrode, said cable being connected to said electrode and passing through said aperture, means for sealing said aperture, an electrode extrinsic to said conduit, a second electric cable, said second cable being connected to said extrinsic electrode, an electrolyte, said conduit and said electrodes being wetted by said electrolyte to provide electric conduction paths between said electrodes.

9. A liquid rheostat having a large power capacity and adapted for a three-phase network comprising first, second and third insulative conduits, each of said conduits being adjustable in length, first, second and third hollow electrodes, said electrodes being disposed within said first, second and third conduits, respectively, each of said conduits having an aperture near its hollow electrode, first, second and third electric conductors each covered with electric insulation, said first, second and third conductors being electrically connected to said first, second and third hollow electrodes, respectively, and passing respectively through said apertures in said first, second and third conduits, means for sealing each aperture, a collar, said collar being attached to peripheral portions of said first, second and third conduits, an electrolyte, said conduits, electrodes, being immersed in said electrolyte so as to provide a plurality of conduction paths among said electrodes.

10. Load apparatus adapted to be connected to first and second terminals of an electrical circuit and adapted to operate while immersed in an electrolyte comprising a first electrically insulative conduit that is substantially linear, a first fistular electrode that is short with respect to said conduit, said first electrode being fixedly disposed within said conduit so as to enable said electrolyte to flow through said electrode and said conduit, a second electrically insulative conduit that is substantially linear, a second fistular electrode that is shorter than said second conduit, said second electrode being fixedly disposed within said second conduit so as to enable said electrolyte to flow through said second electrode and said second conduit, means for attaching said first conduit to said second conduit, means for connecting said first electrode to said first terminal, and means for connecting said second electrode to said second terminal.

References Cited in the file of this patent
UNITED STATES PATENTS

| 1,550,164 | Heinrich | Aug. 18, 1925 |

FOREIGN PATENTS

| 18,623 | Great Britain | Sept. 4, 1908 |
| 101,381 | Australia | July 1, 1937 |